United States Patent [19]

Withjack

[11] 4,421,943
[45] Dec. 20, 1983

[54] COLLAPSIBLE MOBILE SOLAR ENERGY POWER SOURCE

[75] Inventor: Eric M. Withjack, Broken Arrow, Okla.

[73] Assignee: Cities Service Company, Tulsa, Okla.

[21] Appl. No.: 350,507

[22] Filed: Feb. 19, 1982

[51] Int. Cl.³ .......................... H01L 31/04; F24J 3/02
[52] U.S. Cl. .................................... 136/246; 126/417; 126/450; 136/245; 136/291; 248/455; 248/461
[58] Field of Search ................ 126/417, 450; 136/246, 136/245, 291; 248/354 R, DIG. 10, 461, 455, 456, 454

[56] References Cited

U.S. PATENT DOCUMENTS

| | | |
|---|---|---|
| 1,208,622 | 12/1916 | Muller ................................ 248/461 |
| 2,194,019 | 3/1940 | Hartsel ............................... 248/461 |
| 2,865,132 | 12/1958 | Fleming .............................. 248/461 |
| 3,031,247 | 4/1962 | Schieve .............................. 248/461 |
| 3,313,505 | 4/1967 | Petrie ............................... 248/354.5 |
| 3,355,136 | 11/1967 | Staples ............................. 248/354.5 |
| 3,953,029 | 4/1976 | Boyd .............................. 248/DIG. 10 |
| 4,116,413 | 9/1978 | Andersen ............................. 248/455 |
| 4,145,021 | 3/1979 | Gaechter ............................. 248/455 |
| 4,167,178 | 9/1979 | Brussels ............................. 126/450 |
| 4,226,256 | 10/1980 | Hawley .............................. 126/417 |

FOREIGN PATENT DOCUMENTS 3010571 9/1981 Fed. Rep. of Germany ...... 136/246

Primary Examiner—Daniel J. O'Connor
Attorney, Agent, or Firm—Robert H. Sproule; George L. Rushton

[57] ABSTRACT

An apparatus for collecting solar energy and converting it to electrical energy utilizing solar panels pivotally mounted to a base such that the panels may be pivoted to a storage position inside said base. Additional solar panels may be pivotally mounted on retractable frame trays which stow inside the base when the panels are pivoted to a horizontal position.

6 Claims, 11 Drawing Figures

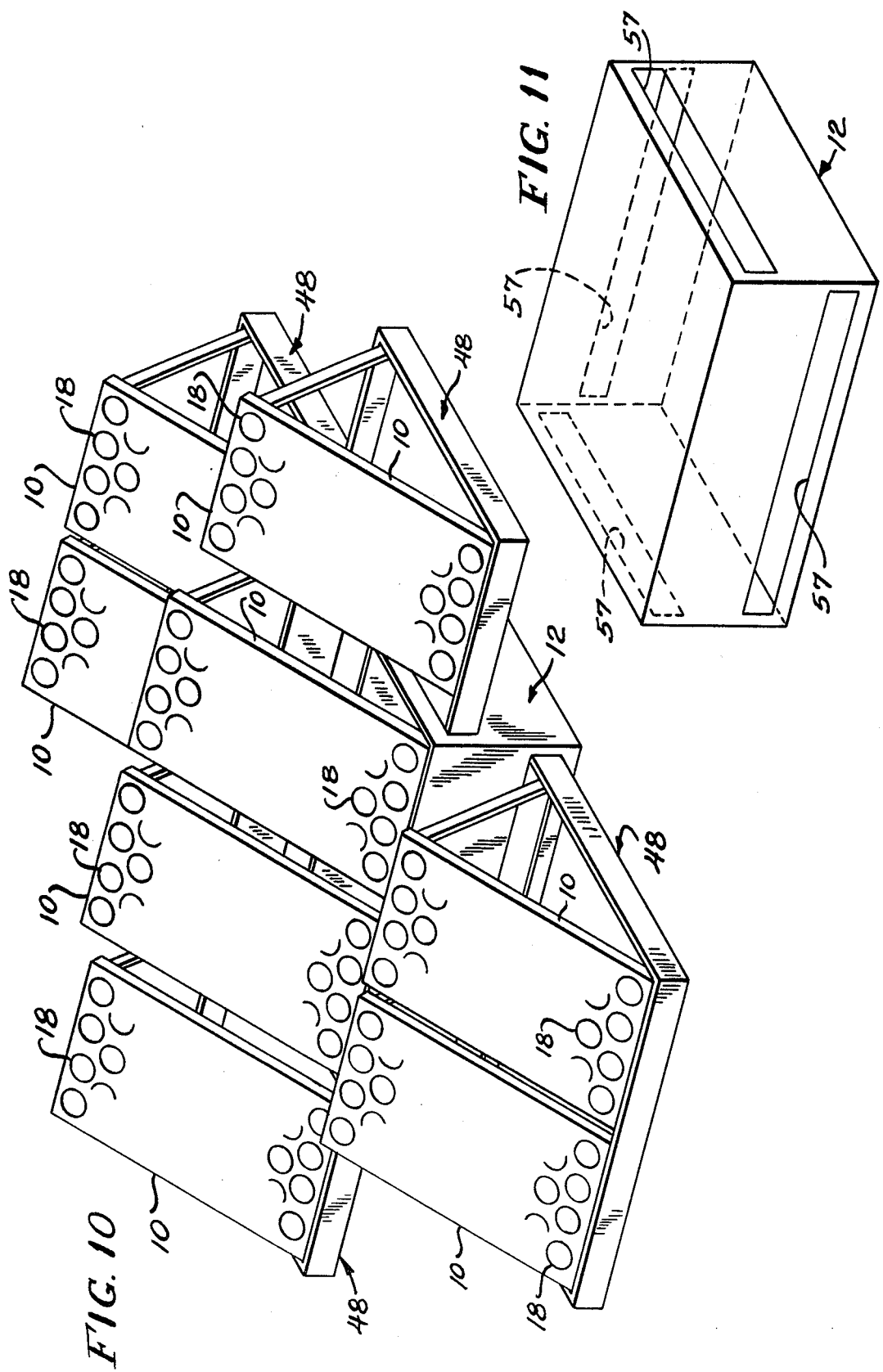

COLLAPSIBLE MOBILE SOLAR ENERGY POWER SOURCE

BACKGROUND OF THE INVENTION

1. Field of the Invention

The present invention relates to a solar energy collection system and more particularly to a mobile solar energy power source having collapsible solar panels.

2. Description of the Prior Art

Frequently a need arises for a mobile solar power system which can be easily relocated as site requirements for electrical power change. Installation of a permanent system requiring expensive structures is often not cost-effective when only a temporary power system is necessary. Such a temporary system is often required for remote field instrumentation, lighting in temporary locations, and assistance in remote regions or disaster areas. In many of these areas electrical power is either not available or has been incapacitated, thereby making solar power a practical and inexpensive means of providing energy.

Portable solar cells made of thin film cadmium sulfide as in U.S. Pat. No. 3,411,050 by Middleton utilize flexible solar arrays wound onto a mandrel for ease of transportation. These cadmium sulfide cells are flexible thereby allowing them to be wound onto a mandrel, but they are also self-degrading, susceptible to temperature and moisture attack, and have a much lower efficiency than the rigid silicon cells used in my invention. Therefore, what is needed and what has been invented is an apparatus for converting solar energy to electrical energy using rigid solar cells which are collapsible and transportable without the foregoing deficiencies associated with the prior art apparatuses.

SUMMARY OF THE INVENTION

The present invention accomplishes its desired objects by broadly providing an apparatus for delivering electrical energy from a mobile solar energy power source having solar energy collecting means which pivot into a storage base. The apparatus comprises at least one inner solar energy collecting means for collecting solar energy and converting the solar energy into electrical energy, the collecting means having an upper and lower end; and a main base including a front and back thereof. The lower end of the inner collecting means is pivotally mounted to the front of the main base such that the collecting means is free to pivot about the mounting axis between about 0° and about 90° above the horizontal. The invention also comprises at least one inner support member for each inner collecting means, the inner support member having a first end and a second end. The first end of the inner support member is pivotally connected in proximity to the upper end of the inner collecting means. Means exist in the invention for connecting the second end of the inner support member to the main base such that the inner collecting means may be positioned at any angle between about 0° and about 90° above the horizontal plane. Means for storing the electrical energy and supplying the electrical energy to an external receptacle is also part of the invention.

Alternatively, the invention may also include at least one outer collecting means having an upper and lower end, and at least one retractable base including a front and back thereof. The lower end of the outer collecting means is pivotally mounted to the front of the retractable base. The retractable base is retractably mounted to the main base so as to allow movement of the retractable base between a position generally exterior to and in proximity with the main base and a position inside the main base. At least one outer support member is present for each outer collecting means, the outer support member having a first end and a second end. The first end of the outer support member is connected in proximity to the upper end of the collecting means. Means connect the second end of the outer support means to the retractable base such that the outer collecting means may be positioned at an angle between about 0° and about 90° above the horizontal.

It is therefore an object of the present invention to provide a mobile solar energy power source.

It is another object of this invention to provide a mobile solar energy power source having solar energy collecting means which pivot into the main base for convenient storage.

It is another object of this invention to provide a mobile solar energy power source having solar energy collecting means which pivot and subsequently retract into the sides of the main base for convenient storage.

These, together with various ancillary objects and features which will become apparent as the following description proceeds, are obtained by this novel apparatus, preferred embodiments being shown in the accompanying drawings, by way of example only, wherein:

BRIEF DESCRIPTION OF THE DRAWING

FIG. 10 is a perspective view illustrating the positioning of outer collecting means at all sides of the main base; and FIG. 11 is a perspective view illustrating the staggered storage positions when four retractable bases are utilized.

DETAILED DESCRIPTION OF THE INVENTION

Figure 1:
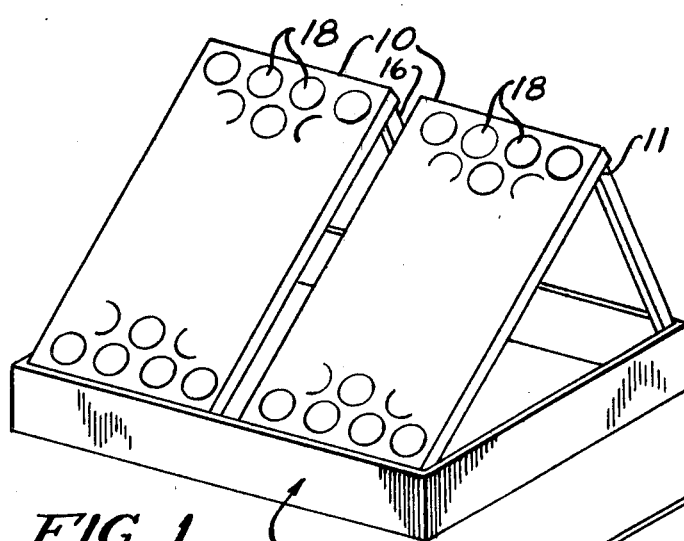
FIG. 1 is a perspective view of two inner collecting means supported in the collecting position by the inner support members, the lower ends of the inner collecting means pivotally attach to the main base.
Figure 4:
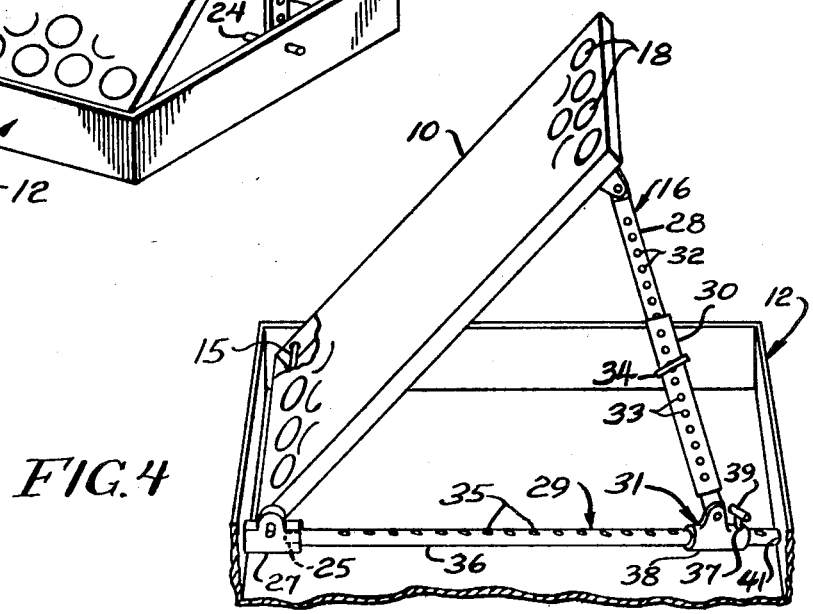
FIG. 4 is a perspective side view illustrating a telescopic inner support member pivotally connected to a hollow cylinder which is slidably mounted on a base rod.

Referring in detail now to the drawings wherein like or similar parts of the invention are identified by like reference numerals throughout the various views, FIG. 1 illustrates an inner collecting means generally comprising a rigid flat inner collecting surface 10 and a plurality of known art silicon solar cells 18 attached to the collecting surface 10 in order to collect impinging solar radiation and convert the solar radiation into electrical energy. Solar cells 18 are generally encapsulated and covered with a transparent elastomeric surface known in the art. The lower end of inner collecting surface 10 is pivotally mounted to a main base, generally illustrated as 12, so as to be capable of pivotation about a mounting axis from about 0° to about 90° above the horizontal. As depicted in FIG. 4, the mounting axis may comprise a pivot rod 15, one end of pivot rod 15 is inserted through main base 12, the other end of pivot rod 15 is inserted through fixed shoe 27; fixed shoe 27 is fixedly mounted to main base 12. Returning to FIG. 1, movement of collecting surface 10 through a 90° arc is necessary in order to place it at the proper angle to maximize the amount of solar rays impinging upon collector cells 18.

Main base 12 defines an aluminum or lightweight rigid frame to pivotally support collecting surface 10 and solar cells 18. The size and number of inner collecting means mounted to main base 12 will depend upon both the power requirements and the size of main base 12. Typically, two collecting surfaces measuring four feet by eight feet will be sufficient to meet most power requirements. An inner support member, generally illustrated as 16, is used to support inner collecting surface 10 when inner collecting surface 10 is raised from the horizontal or storage position (depicted in FIG. 2) to the collecting position depicted in FIG. 1. At least one inner support member 16 for each inner collecting surface 10 is required, however additional support members may be used to provide further support and stability to collecting surface 10. One end of inner support member 16 is pivotally attached in proximity to the upper end of inner collecting surface 10 at 11 to allow the angular position of collecting surface 10 to be easily changed. Pivotal attachment point 11 may be located generally on the upper half of inner collecting surface 10. In addition, pivotal attachment of inner collecting surface 10 to inner support 16 allows inner support member 16 to generally align with the plane of collecting surface 10 for easy storage when collecting surface 10 is in the horizontal position. The other end of inner support member 16 is connected to main base 12 such that the inner collecting means may be positioned at an angle between about 0° and about 90° above the horizontal plane.

Figure 2:
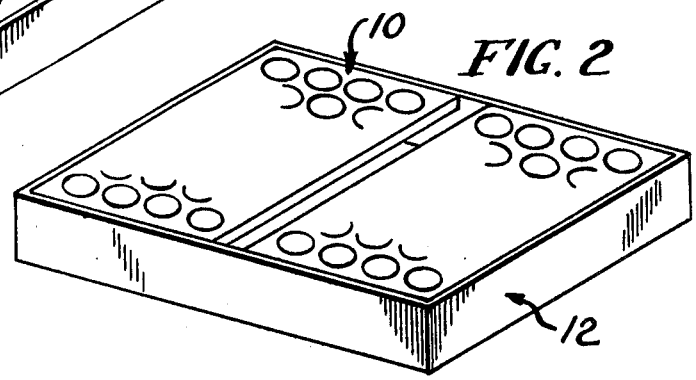
FIG. 2 is a perspective view of the two inner collecting means in the storage position.
Figure 3:
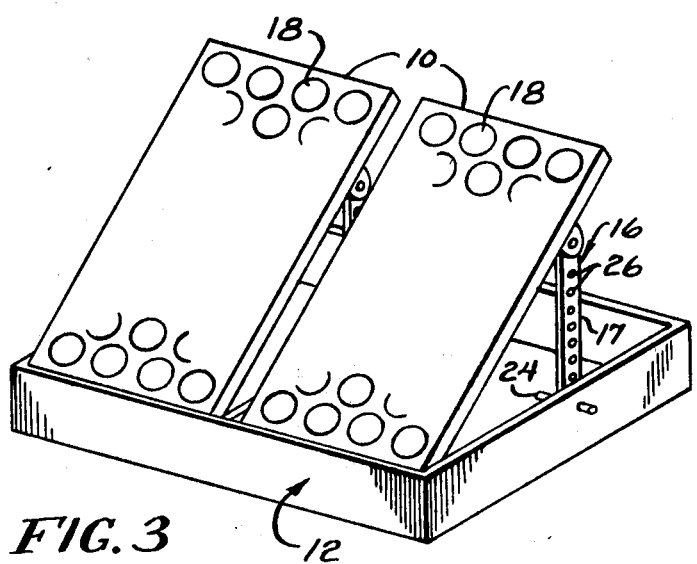
FIG. 3 is a perspective view illustrating a means of connecting the inner support means to the main base comprising a prong fixedly attached to the inside of the main base and inserted into one of the holes in the inner support member.

As depicted in FIG. 3, in one preferred embodiment of the invention, inner support member 16 may comprise an inner stanchion 17 having a plurality of holes 26 between each end thereof. A prong 24 is fixedly mounted to main base 12. Any one of the holes 26 may be mated with prong 24 in order to determine the angle of the inner collecting surface 10 relative to the horizontal. Pivotal attachment point 11 and prong 24 must be mounted sufficiently toward pivot rod 15 such that the free end of inner support member 16 will clear the rear portion of main base 12 when inner collecting surface 10 is placed in a low angular position relative to the horizontal. In order to store collecting surface 10 as shown in FIG. 2, inner stanchion 17 is removed from prong 24 and pivoted underneath and aligned with the collecting surface 10; the combined aligned stanchion 17 and collecting surface 10 is subsequently pivoted into the storage position.

In another preferred embodiment of the invention as depicted in FIG. 4, inner support member 16 may comprise a two-piece stanchion including an inner leg 28 and an outer leg 30 which are made of a lightweight material such as aluminum having sufficient strength to support collecting surface 10. Inner leg 28 slidably mates within outer leg 30 such that the longitudinal axis of inner leg 28 is longitudinally aligned with the longitudinal axis of outer leg 30. The length of inner support member 16 is changed by sliding inner leg 28 within outer leg 30 along their respective longitudinal axes. By changing the length of inner support member 16, the angular position of inner collecting surface 10 is also changed. Inner leg 28 and outer leg 30 also respectively include a plurality of holes 32 and 33 along their respective longitudinal axes that are capable of being collimated with respect to each other. Holes 32 and 33 are sized to accept a removable prong 34 when at least one of the holes 32 in inner leg 28 is concentrically aligned with at least one of the holes 33 in outer leg 30, thereby fixing the position of inner leg 28 relative to outer leg 30 along their respective longitudinal axes.

Inner support member 16 is mounted to an inner sliding shoe generally illustrated as 31. The inner sliding shoe 31 is slidably mounted onto an inner guide member, generally illustrated as 29, for movement of the inner sliding shoe 31 on and along the inner guide member 29 between the front and back of main base 12. As depicted in FIG. 4, the inner guide member 29 may comprise a base rod 36 having two ends, one end which mates within opening 25 of fixed shoe 27, the other end which is attached to the back of main base 12 at 41. The inner sliding shoe 31 may comprise a hollow cylinder 38 axially aligned on and along the longitudinal axis of rod 36 and pivotally connected to support member 16. Rod 36 includes a plurality of holes 35 along its longitudinal axis. Cylinder 38 includes a hole 37 through its top and bottom. Upon concentrical alignment of hole 37 with any one of holes 35, removable prong 39 is inserted within holes 37 and 35 to fix the position of cylinder 38 longitudinally along rod 36. Movement of cylinder 38 on and along rod 36 in combination with the sliding of inner leg 28 within outer leg 30 allows the angular position of inner collecting surface 10 to be fixed between about 0° and about 90° above the horizontal without having to detach inner support member 16 from main base 12.

When storage of inner collecting surface 10 is desired, prong 34 is withdrawn from inner support member 16 and inner leg 28 is slid into outer leg 30. At the same time prong 39 is withdrawn from cylinder 38 and cylinder 38 is moved longitudinally along base rod 36 toward pivot rod 15 resulting in inner collecting surface 10 pivoting into the horizontal position. When the length of inner support member 16 is less than the length of inner collecting surface 10, however; inner leg 28 need not be telescoped into outer leg 30 in order to store inner collecting surface 10. For placement of collecting surface 10 in the collecting position, the above process is simply reversed. Movement of inner collecting surface 10 between the collecting position and the storage position may be accomplished manually or by a solar powered motor. A covering device such as a tarpaulin (not shown in the drawings) may be placed over main base 12 and collecting surface 10 to protect the apparatus when the collecting means is in the storage position.

Figure 5:
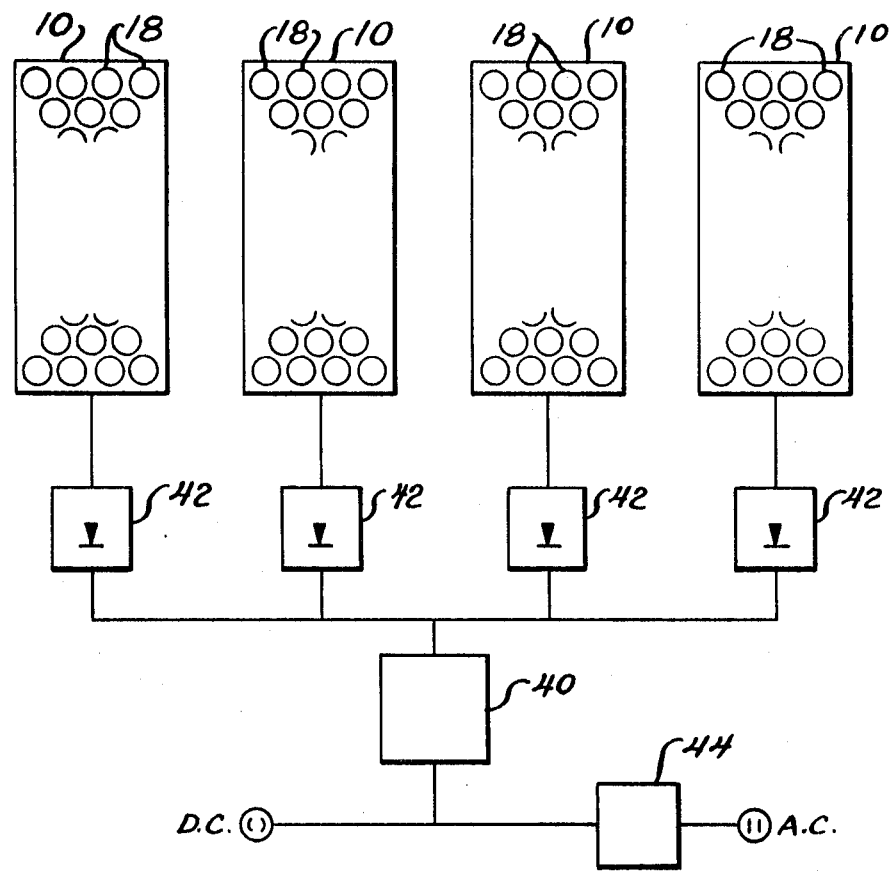
FIG. 5 is a diagram of the main electrical components of the apparatus.

The invention also comprises means for storing electrical energy received from the collecting means and supplying this energy to an external receptacle. The components of the storage/supply means are known in the art and shown schematically in FIG. 5 including a storage battery 40 wired to collecting surface 10, and voltage regulators 42 connected between battery 40 and collecting surface 10 to regulate the voltage output from solar cells 18. The size of the battery 40 will depend upon the reserve power necessary for night use or for day use when clouds obscure the sun. A battery storage system having a 1500 ampere-hour capacity would supply approximately one week of reserve power under a 100 watt electrical load. The storage/supply means may also include an inverter 44 to convert direct current into alternating current, and various other electrical components which are well known in the art.

Figure 6:
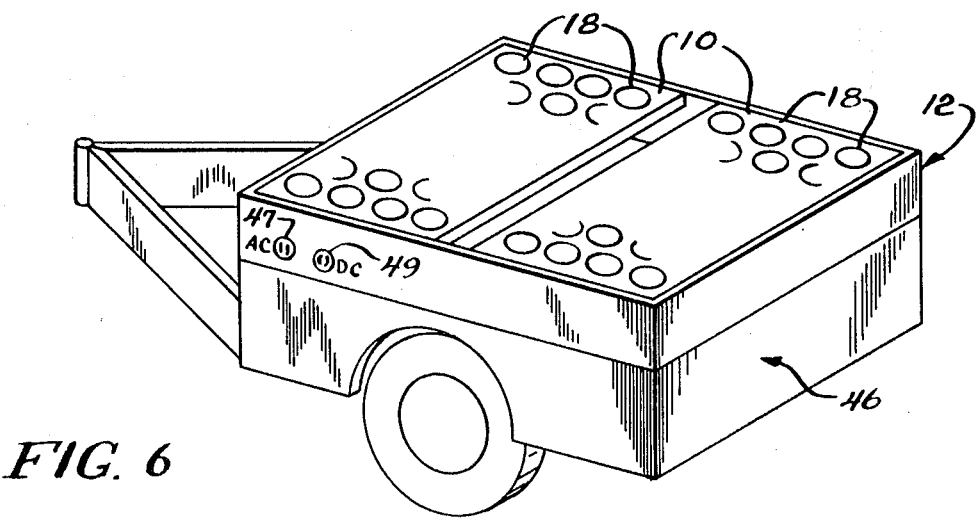
FIG. 6 is a perspective side view of a transportation means comprising a two-wheel trailer.

As depicted in FIG. 6 a pair of external receptacles 47 and 49 are mounted on the front of main base 12 for providing alternating current and direct current respectively.

The invention also comprises means for transporting the inner collecting means, inner support member, main base and storage/supply .means. The transportation means may comprise a two-wheel trailer 46 as depicted in FIG. 6, or it may include trucks, skids, rail cars, water surface craft, or the like.

Figure 7:
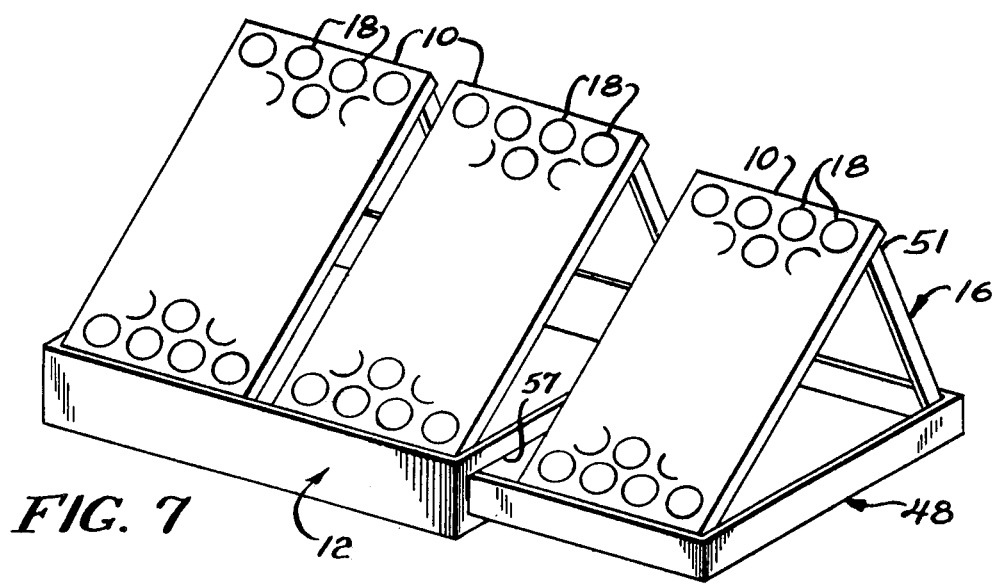
FIG. 7 is a perspective view of the inner and outer collecting means in the collecting position.
Figure 9:
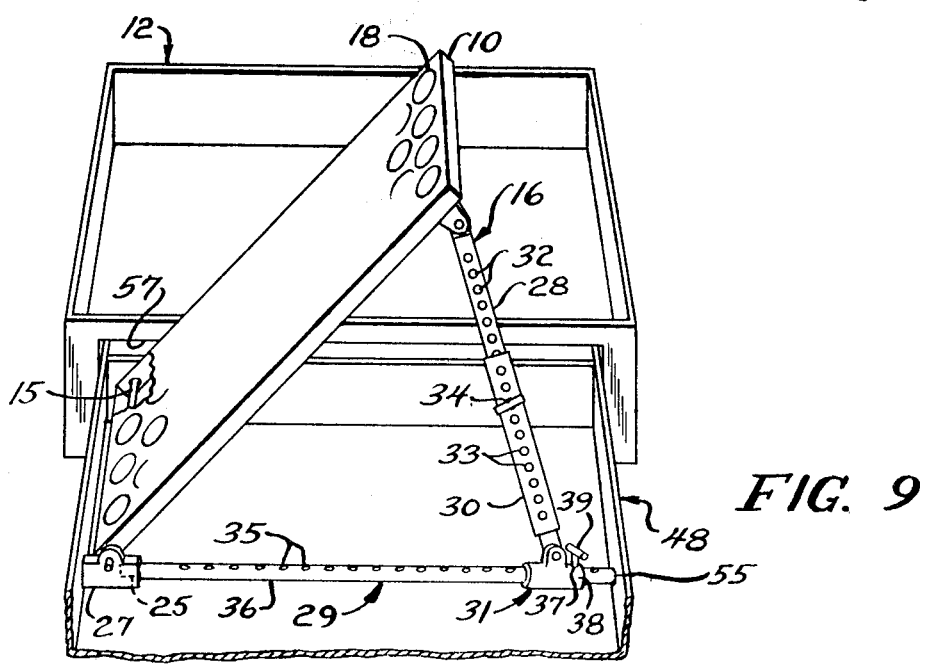
FIG. 9 is a perspective side view illustrating a telescopic outer support member pivotally connected to a hollow cylinder slidably mounted on a base rod.

In another embodiment of the invention, as depicted in FIG. 7, a retractable base generally illustrated as 48 is retractably mounted to main base 12 so as to allow retractable base 48 to move between a position exterior from and in proximity with main base 12 to a position inside main base 12 through main base opening 57. Retractable base 48 may be mounted on rollers (not shown in drawings) which are affixed to main base 12 in order to allow easy movement of retractable base 48 in and out of main base 12. The outer collecting means comprising collecting surface 10 and silicon cells 18 is pivotally mounted on retractable base 48 such that collection surface 10 may pivot about a mounting axis between about 0° and about 90° above the horizontal. As depicted in FIG. 9, the mounting axis may comprise a pivot rod 15, one end of pivot rod 15 is inserted through retractable base 48, the other end of pivot rod 15 is inserted through fixed shoe 27; fixed shoe 27 is fixedly mounted to retractable base 48. Returning to FIG. 7, it is important to note that outer collecting surface 10 must be in the horizontal or storage position within retractable base 48 before retractable base 48 can be retracted inside main base 12. The outer collecting means will generally have identical size, shape, and collecting characteristics as the inner collecting means, the main difference being that the inner collecting means is mounted to main base 12, and the other collecting means is mounted to retractable base 48. The outer support member 16 is used to support outer collecting surface 10 when outer collecting surface 10 is raised to the collecting position as depicted in FIG. 7. One end of outer support member 16 is pivotally connected in proximity to the upper end of outer collecting surface 10 at 51. Pivotal attachment point 51 may be located generally on the upper half of outer collecting surface 10. The other end of outer support member 16 is connected to retractable base 48 such that the outer collecting means may be positioned at any angle between about 0° and about 90° above the horizontal plane.

Figure 8:
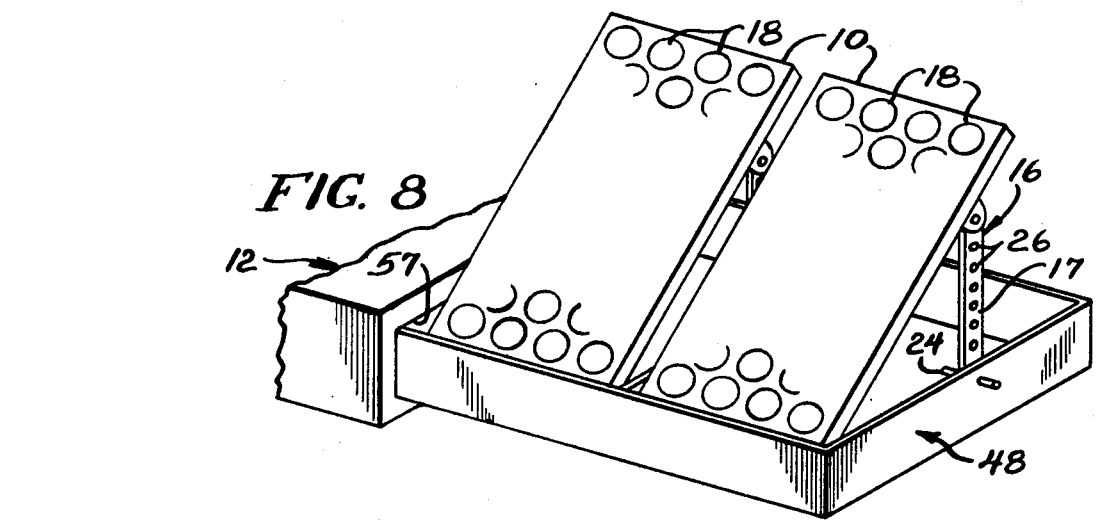
FIG. 8 is a perspective view illustrating a means of connecting the outer support member to the main base which includes a prong fixedly attached to the inside of the retractable base and inserted into one of the holes in the outer support member.

As depicted in FIG. 8, outer support member 16 may comprise an inner stanchion 17 having a plurality of longitudinally displaced holes 26 between each end thereof. A prong 24 is fixedly mounted to retractable base 48. Any one of holes 26 may be mated with prong 24 in order to determine the angle of outer collecting surface 10 relative to the horizontal. Pivotal attachment point 51 and prong 24 must be mounted sufficiently toward pivot rod 15 such that the free end of outer support member 16 will clear the rear of retractable base 48 when outer collecting surface 10 is placed in a low angular position relative to the horizontal. In order to store outer collecting surface 10, outer stanchion 17 is removed from prong 24 and pivoted to align with the plane of outer collecting surface 10. Outer collecting surface 10 is then pivoted into the horizontal position and base 48 is retracted inside main base 12.

In a preferred embodiment as depicted in FIG. 9, outer support member 16 comprises a two-piece stanchion including an inner leg 28 slidably mated within outer leg 30 such that the longitudinal axis of inner leg 28 is longitudinally aligned with the longitudinal axis of outer leg 30. The length of outer support member 16 is changed by sliding inner leg 28 within outer leg 30 along their respective longitudinal axes. By changing the length of outer support member 16, the angular position of outer collecting surface 10 is also changed. Inner leg 28 and outer leg 30 also respectively include a plurality of holes 32 and 33 along their respective longitudinal axes that are capable of being collimated with respect to each other. Holes 32 and 33 are sized to accept a removable prong 34 when at least one of the holes 32 in inner leg 28 is concentrically aligned with at least one of the holes 33 in outer leg 30, thereby fixing the position of inner leg 28 relative to outer leg 30 along their respective longitudinal axes. In addition, outer support means 16 is pivotally mounted to the outer sliding shoe 31. The outer sliding shoe 31 is slidably mounted to the outer guide member 29 for movement of the outer sliding shoe 31 on and along the outer guide member 29 between the front and back of retractable base 48. As further depicted in FIG. 9, the outer guide member 29 may comprise a base rod 36 having two ends, one end which mates with opening 25 of fixed shoe 27, the other end which is attached to the back of retractable base 48 at 55. The outer sliding shoe 31 may comprise a hollow cylinder 38 axially aligned on and along the longitudinal axis of rod 36 and pivotally connected to outer support member 16. Rod 36 includes a plurality of holes 35 along its longitudinal axis. Cylinder 38 includes a hole 37 through its top and bottom. Upon concentrical alignment of hole 37 with any one of holes 35, prong 39 is inserted within holes 37 and 35 to fix the position of cylinder 38 longitudinally along rod 36. Movement of cylinder 38 on and along rod 36 in combination with the sliding of inner leg 28 within outer leg 30 allows the angular position of outer collecting surface 10 to vary between about 0° and about 90° above the horizontal without having to detach outer support member 16 from retractable base 48. When storage of outer collecting surface 10 is desired, prong 34 is withdrawn and inner leg 28 is slid into outer leg 30. At the same time prong 39 is removed from cylinder 38 and cylinder 38 is moved toward the front of retractable base 48 along base rod 36 resulting in outer collecting surface 10 pivoting into the horizontal position. Retractable base 48 is then retracted into main base 12. When the length of inner support member 16 is less than the length of inner collecting surface 10, however; inner leg 28 need not be telescoped into outer leg 30 in order to store inner collecting surface 10. Movement of outer collecting surface 10 between the collecting position and the storage position as well as movement of retractable base 48 between the interior and exterior of main base 12 may be performed manually or by solar powered motor.

Additional retractable bases may be located exterior to and in proximity with the remaining three sides of main base 12 as depicted in FIG. 10. In order to provide storage spaces inside main base 12 for the retractable bases and outer collecting means, the retractable bases may be stored inside main base 12 in a stair step manner as depicted in FIG. 11. When retractable bases 48 are rolled out of main base 12 and the outer collecting means are placed in their collecting positions, the outer collecting means will be at different levels relative to each other, however there will be little effect on the operational efficiency of the outer collecting means or inner collecting means because collecting surfaces 10 do not block each other from impinging solar radiation during most daylight hours. Additional collecting means may require additional voltage regulators 42 and a larger capacity battery 40. The requirements of the transportation means will not change with the increase in the number of collecting means and accompanying apparatus since the size and weight changes are comparatively small.

While the present invention has been described herein with reference to particular embodiments thereof, a latitude of modification, various changes and substitutions are intended in the foregoing disclosure, and in some instances some features of the invention will be employed without a corresponding use of other features without departing from the scope of the invention as set forth.

I claim:

1. An apparatus for providing electrical energy from a mobile solar energy power source having collapsible solar energy collecting means, comprising:
   (a) at least one inner solar energy collecting means for collecting solar energy and converting the solar energy into electrical energy, said inner collecting means having an upper end and a lower end;
   (b) a main base including a front and a back thereof, said main base pivotally mounted to the lower end of said inner collecting means such that said inner collecting means is free to pivot about the mounting axis between 0° and about 90° above the horizontal;
   (c) at least one inner support member for each inner collecting means, said inner support member having a first end and a second end, the first end of said inner support member pivotally connected in proximity to the upper end of said inner collecting means, said inner support member comprising an inner leg and an outer leg including respective longitudinal axes thereof, the inner leg slidably mated within the outer leg such that the longitudinal axis of the inner leg is longitudinally aligned with the longitudinal axis of the outer leg, the length of said inner support member changeable by sliding the inner leg within the outer leg along their respective longitudinal axes;
   (d) an inner guide member having a longitudinal axis, said inner guide member attached to said main base such that said inner guide member longitudinally traverses said main base between the front and the back thereof;
   (e) an inner sliding shoe pivotally connected to the second end of said inner support member, said inner sliding shoe mounted to said inner guide member for movement along said inner guide member between the front and the back of said main base such that movement of said sliding shoe along said inner guide member in combination with the sliding of the inner leg within the outer leg allows positioning of said inner collecting means at an angle between about 0° and about 90° above the horizontal; and
   (f) means for storing the electrical energy received from the inner solar energy collecting means and supplying the energy to an external receptable.

2. The apparatus for providing electrical energy from a mobile solar energy power source as recited in claim 1, additionally comprising means for transporting the apparatus of claim 1.

3. The apparatus for providing electrical energy from a mobile solar energy power source as recited in claim 2, wherein:
   (a) the inner leg and the outer leg respectively of said inner support member include a plurality of holes along their respective longitudinal axes, at least one of the holes in the inner leg aligned concentrically with at least one of the holes in the outer leg in order to accept a removable prong therethrough;
   (b) said inner guide member includes a plurality of holes along its longitudinal axis; and
   (c) said inner sliding shoe includes a hole therethrough, the hole in the inner sliding shoe aligned concentrically with one of the holes in the inner guide member in order to accept a removable prong therethrough.

4. The apparatus for providing electrical energy from a mobile solar energy power source as recited in claim 1, additionally comprising:
   (a) at least one outer solar energy collecting means for collecting solar energy and converting the solar energy into electrical energy, said outer collecting means having an upper end and a lower end;
   (b) at least one outer support member for each outer collecting means, said outer support member having a first end and a second end, the first end of said outer support member pivotally connected in proximity to the upper end of said outer collecting means, said outer support member comprising an inner leg and an outer leg including respective longitudinal axes thereof, the inner leg slidably mated within the outer leg such that the longitudinal axis of the inner leg is longitudinally aligned with the longitudinal axis of the outer leg, the length of said outer support member changeable by sliding the inner leg within the outer leg along their respective longitudinal axes;
   (c) an outer guide member having a longitudinal axis, said outer guide member attached to said retractable base such that said outer guide member longitudinally traverses said retractable base between the front and the back thereof; and (d) an outer sliding shoe pivotally connected to the second end of said outer support member, said outer sliding shoe mounted to said outer guide member for movement along said outer guide member between the front and the back of said retractable base such that the movement of said outer sliding shoe along said outer guide in combination with the sliding of the inner leg within the outer leg allows positioning of said outer collecting means at an angle between about 0° and about 90° above the horizontal.

5. The apparatus for providing electrical energy from a mobile solar energy power source as recited in claim 4, additionally comprising means for transporting the apparatus in claim 4.

6. The apparatus for providing electrical energy from a mobile solar energy power source as recited in claim 5, wherein:
(a) the inner leg and the outer leg of said inner support member and said outer support member respectively, include a plurality of holes along their respective longitudinal axes, at least one of the holes in the inner leg aligned concentrically with one of the holes in the outer leg in order to accept a removable prong therethrough thereby fixing the length of said inner support member and said outer support member respectively;
(b) said inner guide member and said outer guide member each include a plurality of holes along their respective longitudinal axes; and
(c) said inner sliding shoe and said outer sliding shoe each include a hole therethrough, the hole in the inner sliding shoe aligned concentrically with one of the holes in the inner guide member in order to accept a removable prong therethrough, and the hole in the outer sliding shoe aligned concentrically with one of the holes in the outer guide member in order to accept a removable prong therethrough.

* * * * *